United States Patent
Belcher

(10) Patent No.: US 7,153,455 B2
(45) Date of Patent: Dec. 26, 2006

(54) METHOD OF MAKING A STRETCH/BLOW MOLDED ARTICLE (BOTTLE) WITH AN INTEGRAL PROJECTION SUCH AS A HANDLE

(75) Inventor: Samuel L. Belcher, Moscow, OH (US)

(73) Assignee: Sabel Plastechs Inc., Moscow, OH (US)

(*) Notice: Subject to any disclaimer, the term of this patent is extended or adjusted under 35 U.S.C. 154(b) by 465 days.

(21) Appl. No.: 10/842,367

(22) Filed: May 10, 2004

(65) Prior Publication Data

US 2004/0245678 A1    Dec. 9, 2004

Related U.S. Application Data

(63) Continuation-in-part of application No. 09/861,755, filed on May 21, 2001, now Pat. No. 6,733,716.

(51) Int. Cl.
*B29C 49/12* (2006.01)
*B29B 17/00* (2006.01)

(52) U.S. Cl. .................. 264/37.31; 264/529; 264/531; 264/532; 264/534; 264/535; 264/536

(58) Field of Classification Search ............ 264/37.31, 264/529, 531, 532, 534–536
See application file for complete search history.

(56) References Cited

U.S. PATENT DOCUMENTS

| | | | |
|---|---|---|---|
| 3,342,916 A | 9/1967 | Peters | |
| 3,787,170 A | 1/1974 | Gilbert | |
| 3,928,522 A | 12/1975 | Farrell | |
| 4,727,997 A | 3/1988 | Nakamura et al. | |
| 4,988,279 A | 1/1991 | Belcher | |
| 4,992,230 A | 2/1991 | Belcher | |
| 4,993,931 A | 2/1991 | Belcher | |
| 5,057,266 A | 10/1991 | Belcher | |
| 5,080,855 A | 1/1992 | Belcher | |
| 5,256,341 A | 10/1993 | Denis et al. | |
| 5,275,780 A | 1/1994 | Robinson | |
| 5,543,107 A | 8/1996 | Malik et al. | |
| 6,277,321 B1 | 8/2001 | Vailliencourt et al. | |

FOREIGN PATENT DOCUMENTS

| | | |
|---|---|---|
| DE | 3443715 | 6/1986 |
| JP | 60-147319 | 9/1985 |
| JP | 61-43535 | 3/1986 |
| JP | 3-92326 | 4/1991 |
| JP | 4-71822 | 3/1992 |
| JP | 5-269828 | 10/1993 |

*Primary Examiner*—Suzanne E. McDowell
(74) *Attorney, Agent, or Firm*—Wood, Herron & Evans, LLP

(57) ABSTRACT

The method involves making a hollow blow molded thermoplastic article having an integral handle. An unblown preform of polyethylene terephthalate (PET) is inserted into a blow mold and thereafter stretched by a stretch rod. Blow gas is then injected into the interior of the preform when the blow mold is closed and the preform is at a stretch temperature. After the preform is blown into the shape of the bottle in the mold, blow gas is discharged from the stretch rod onto an interior wall surface where the handle is to be formed. Heated movable mold segments are then advanced within the blow mold from a first retracted position to a second position thereby compressing an interior wall surface of the article into contact with a facing interior wall surface of the bottle to bond the surfaces at an elevated temperature and form an integral handle extending from the exterior wall of the blow molded article.

16 Claims, 6 Drawing Sheets

METHOD OF MAKING A STRETCH/BLOW MOLDED ARTICLE (BOTTLE) WITH AN INTEGRAL PROJECTION SUCH AS A HANDLE

RELATED APPLICATIONS

This application is a continuation-in-part of application Ser. No. 09/861,755, filed May 21, 2001 now U.S. Pat. No. 6,733,716, the disclosure of which is hereby incorporated by reference.

FIELD OF THE INVENTION

The present invention is directed to a method for blow molding a hollow article having an integral projection extending from a wall thereof, such as, a bottle with an integral handle.

BACKGROUND OF THE INVENTION

There is a continuous demand, particularly in the food and beverage industry, for articles, such as bottles, buckets, pitchers, etc., made of clear, tough plastic because they are relatively inexpensive, easy to use, generally non-breakable and serve as good substitutes for glass. It is oftentimes desirable that such articles have handles to as good substitutes for glass. It is oftentimes desirable that such articles have handles to aid in their use, particularly large bottles.

However, it is generally understood that PET lacks sufficient hot melt strength to be extrusion blow molded and it work hardens thereby preventing it from entering shallow areas or forming sharp corners of a mold which form an integral handle. As a result, integrally molded handles on PET bottles have been susceptible to breakage, especially when molded in bottles of larger sizes. The bottle industry has sought an integral-handled PET bottle since PET was first commercially available in 1977. Eastman, DuPont, and other PET resin manufacturers developed a modified PET, called E-PET, that allowed the composition to be extrusion blow molded to form bottles with handles for detergents, milk, etc. However, these bottles were not properly oriented and shattered when drop tested. Also, E-PET was costly and efficiencies in production could not be utilized to reduce the bottles' cost.

Thus, when PET was used and handles were desired, it had been the practice to attach the handle to the PET article in a separate operation, such as by ultrasonic fusion, after the blow molded PET article had been formed in, and removed from, the blow mold. U.S. Pat. No. 4,727,997 discloses a method and apparatus for producing a PET bottle with a PET handle. In a first step, a parison is blow molded in a blow mold which has inwardly extending circumferential ridges to produce a blown bottle with article-encircling grooves therein. In a second step, the blow molded bottle is transferred to a second grip forming mold, which has circumferential grooves therein, and a handle is injection molded onto the bottle.

Another approach has been to injection mold a thermoplastic handle in a separate operation from the blow molding of the container, and then to snap the separately molded handle over the neck or finish of the blown PET bottle. In accordance with a still further proposal, the separately molded handle is inserted into the blow mold and the bottle is blown over, or into, the handle.

The inventor of the present invention, Samuel L. Belcher, has also previously attempted to overcome the problems associated with forming PET bottles with durable integral handles. U.S. Pat. Nos. 4,992,230, 4,993,931 and 5,057,266 all disclose a method and apparatus for making a hollow blow molded PET article with an integral external projection such as a handle. The method includes blow molding the hollow article and then injection molding the integral projection thereon. The apparatus includes a combination mold having separate and independent blow mold and injection mold cavities which communicate at an interface therebetween. In essence, in the method and apparatus of that invention, a PET preform is inserted into a combination blow mold and injection mold wherein the blow mold cavity defines article (bottle) to be blown and the injection mold cavity defines the handle. The blow mold and injection mold cavities are in communication with each other at a location defining the area where the handle is to extend from the container. After insertion into the blow mold, the preform is injected with blow gas from a gas nozzle to conform the preform to the blow mold cavity thereby forming the hollow blow molded bottle. While the pressure of the blow gas holds the preform in conformity with the blow mold cavity, and prior to exhausting the blow gas, molten PET is injected under pressure into the injection mold cavity to form the integral handle and bond it to the blown preform bottle at the point where the injection mold cavity communicates with the blow mold cavity. The combination mold is then opened and the finished bottle is removed.

It is also known to form chimes in drums and handles in bottles by trapping materials in extruded plastic parisons where there is significant waste of polymeric materials.

None of the above practices, however, has been entirely satisfactory in making PET bottles with integral handles since they add steps to the fabrication process, utilize extra materials, and employ complicated molds. Furthermore, other known methods requiring ultrasonic bonding equipment or multiple separate molds are unduly time-consuming, unnecessarily expensive and still do not overcome the handle breakage problem seen in larger bottles or containers.

SUMMARY OF THE INVENTION

The present invention overcomes the above problems by providing a new method of forming an integral handle or projection on a hollow plastic article such as a bottle. The method involves first blow molding a thermoplastic, preferably PET, into the shape of a bottle and thereafter pinching the side wall of the blown bottle so as to bond adjacent interior wall surfaces together and integrally form the handle. This method thus avoids material waste associated with prior practices. While the description hereinafter makes reference to PET, the invention is equally applicable for polypropylene, polyolefins, PVC, and styrenes.

In a preferred method of this invention, a PET preform is inserted into the blow mold cavity which defines a bottle shape. In the blow mold, each cavity half has a handle contour shape and a movable mold segment which cooperates with another segment to define the integral handle or projection extending from the blown bottle. The movable mold segments are in a first retracted position which creates a void around each segment since the recessed metal segment occupies one-half of the handle to body radius that blends the handle to the body. After inserting the PET preform into the bottle-defining blow mold cavity, a stretch rod is inserted into the interior of the preform to stretch the preform a predetermined amount. The PET preform is then injected with a first blow gas to conform the preform to the blow mold cavity, thereby forming the hollow blow molded bottle. This first blow gas may be injected via a hollow stretch rod or from another source, in which case the stretch rod need not be hollow. PET, with its unique strain hardening, when being expanded under heated conditions from the preform shape, will not blow into the segment voids in the closed blow mold. Rather, the PET of the preform will slide over these voids and fill the mold cavity. Thus, the method takes advantage of this material characteristic of PET when blowing the heated preform into the blow mold cavity with the movable handle segments retracted. These phenomena also allow for the PET to stretch under pressure of the moving segment into the handle-forming position and take the desired bottle shape with a handle.

Prior to blowing the preform in the blow mold cavity, the preform temperature is established at the desired level. For example, if PET is used, the preform temperature is established at its stretch temperature, which is well know for PET to be in the range of about 190° F. to about 265° F. The preform may be one previously made on another machine which is heated to the stretch temperature range in a separate heating operation prior to insertion into the blow mold, or it may be a previously injection molded PET preform (as on a single-stage PET machine) that has cooled to the appropriate stretch temperature immediately prior to insertion in the blow mold cavity. Alternatively, the perform may be compression molded.

Substantially immediately subsequent to blow molding, while the pressure of the first blow gas holds the preform in conformity with the blow mold cavity, and prior to exhausting the blow gas and opening the blow mold, a second blow gas is discharged from a hole in the stretch rod so as to impinge an interior wall of the bottle where the handle is to be formed. Alternatively, the first blow gas may be exhausted prior to injection of the second blow gas. With the second blow gas impinging the interior wall of the bottle, the movable mold segments are advanced within the blow mold cavity from a first retracted position to a second position thereby compressing one surface of the interior wall into contact with an opposing surface of the interior wall to form therebetween an integral handle extending away from the exterior wall of the blow molded bottle. The integral protrusion or handle is formed in the area of the blown preform bottle at the interface where the movable mold segments communicate within the blow mold cavity. After the handle is formed, the mold segments are retracted, the blow gas is exhausted, the stretch rod is retracted and the blow mold is opened. The finished bottle is removed and may be trimmed of excess material. The material in the bonded area of the bottle may be trimmed to form a handle opening in the bottle with a reinforcing rib along the interior of the opening.

The movable mold segments within the blow mold cavity may be unitary segments or may themselves consist of multiple parts. Depending upon the material being blow molded, the movable mold segments may be heated by electrical means. For example, if the material being molded is polypropylene or a polyolefin, then the movable mold segments need not be heated. For fast setting resins such as PET, PVC and styrenes, the movable mold segments should be heated. Preferably the surface temperature for the portions of the movable mold segments that contact the material being molded should be on the order of about 380° F. specifically in the case of PET. In the case where the movable mold segments have multiple parts, an annular or outer perimeter portion of the movable mold segment moves in and presses from either side the bottle material to gather it. That can be done without heating which causes a phase change/crystallization to aid in defining the handle. Thereafter the heated portions of the movable mold segments are pressed in to form a web of material which, when trimmed from the article, leaves the integral formed handle.

It is also contemplated that the interior surface of the blow mold and the surfaces of the movable mold segments that contact the material being molded may be coated with Teflon, a diamond coating, or other suitable release coating. Moreover, to aid in trimming the web of material formed upon the compression by the movable mold segments, a relief pattern may be provided in the perimeter of the movable mold segments so as to create a line of weakness or a bead of material about the perimeter of the web. Additionally, the blow mold cavity may be provided with a movable plug member in the bottom surface that can be used to create a concave bottom wall for the molded bottle, or any other desired pattern or shape.

According to the method of this invention, the handle and bottle are from the same PET parison. Thus, the handle is integral and properly oriented to the hollow blown bottle. Accordingly, there is no need for separate steps of injection molding, ultrasonic bonding, adhesive bonding, snap-on fittings, container encircling rings, or the like. Rather, these steps and materials are avoided by the method of this invention.

Other advantages of the method include utilizing standard PET resins and preforms, and standard PET bottle blow molding machines including wheel, in-line and single stage machines. Most importantly, finished thermoplastic or PET bottles with integral handles as made by the present invention, especially larger bottles, are biaxially-oriented to pass drop tests with filled product. The handles withstand the stresses and weight requirements of containers, especially larger bottles of greater than 32 ounces. Due to the biaxial orientation, the bottles also have increased barrier properties and hot fill capabilities, and satisfy all bottle markets including food, beverage, personal care, medical, liquor, packaging and the like.

In accordance with the novel features and embodiments of this invention which will become further apparent hereinafter, the present invention will be described with reference to the detailed description and the accompanying drawings in which:

DETAILED DESCRIPTION OF THE INVENTION

Figure 1:
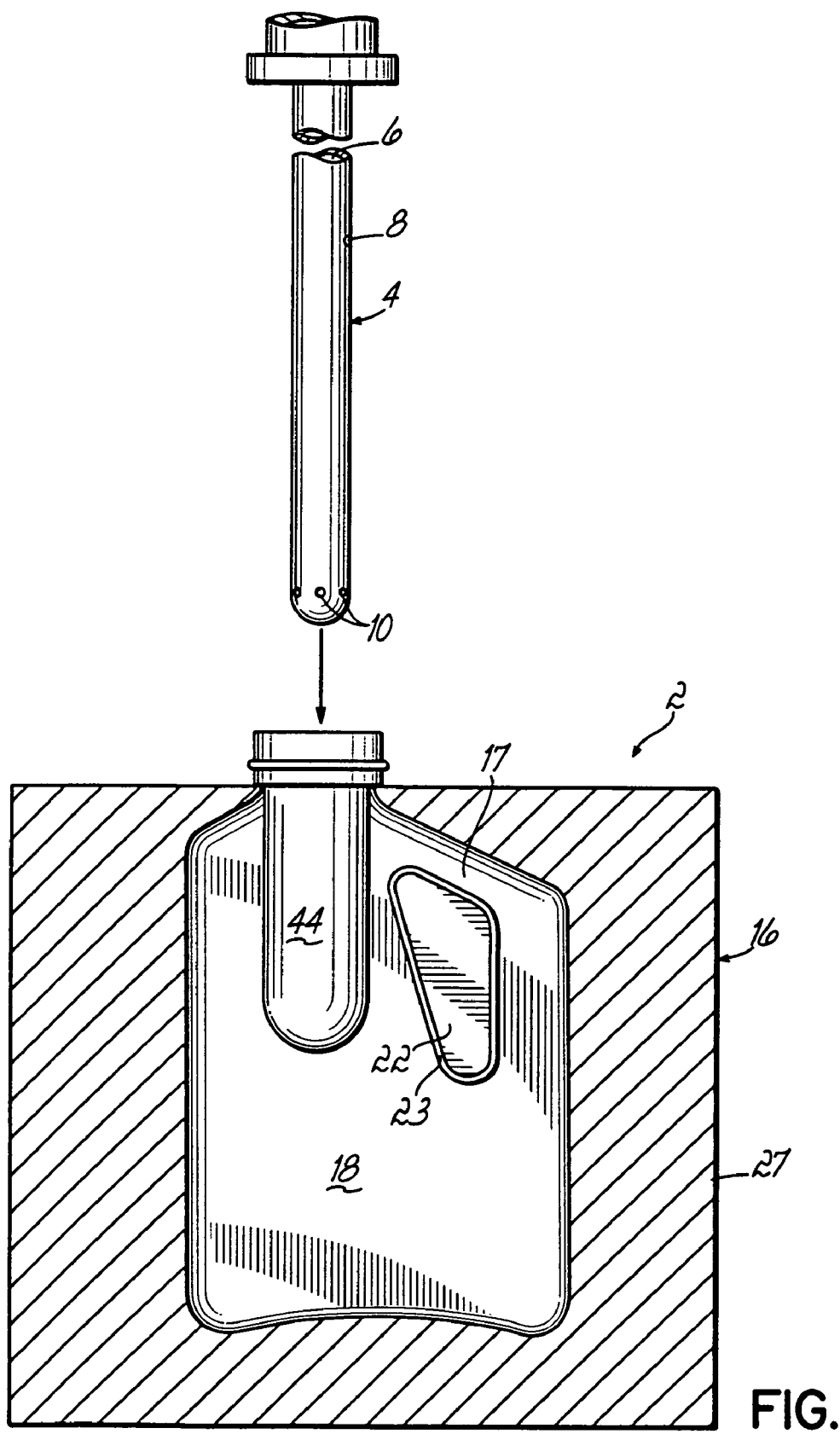
FIG. 1 is a cross sectional view of the closed blow mold showing the stretch rod and blow mold cavity with a preform inserted therein.
Figure 2:
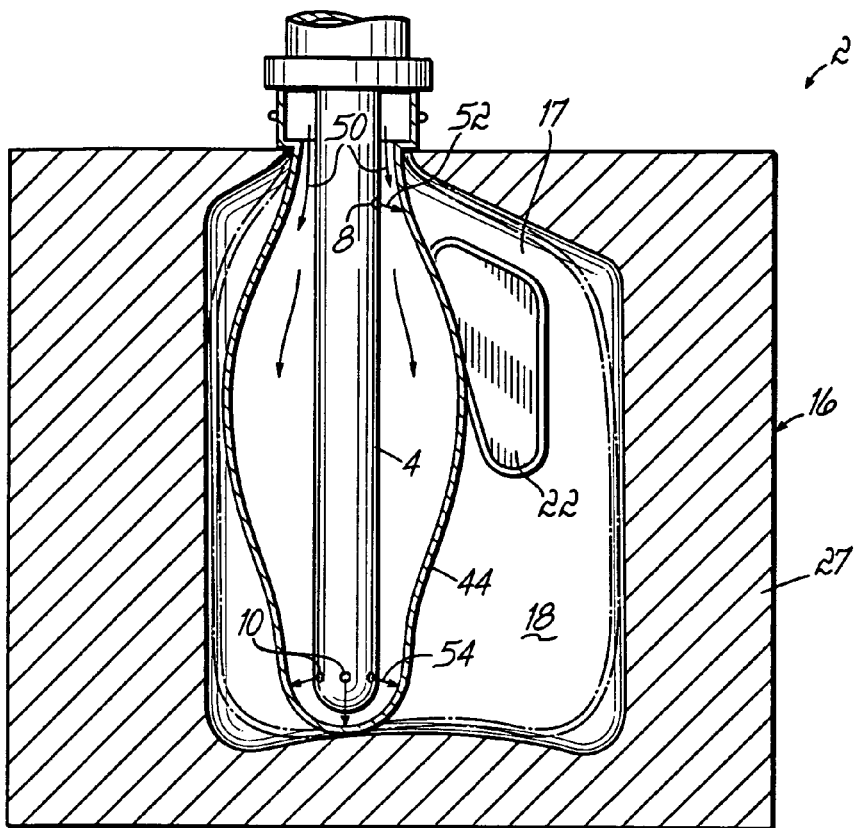
FIG. 2 is a view similar to FIG. 1 showing the stretched preform being expanded by blow gas to conform the preform to the blow mold cavity.

To illustrate and provide a more complete understanding of the preferred embodiment of the present invention, the following description with reference to the drawing figures details a method of making a hollow stretch blow molded bottle of polyethylene terephthalate (PET) having an integral handle extending from the exterior wall thereof. It will be appreciated that the invention is equally applicable for blow molding other thermoplastic materials.

With reference to FIG. 1, the blow mold apparatus 2 of the present invention is shown having a stretch rod 4. Stretch rod 4 includes a hollow center 6 which is adapted to connect to a source of gas, such as oil-free blow gas. Stretch rod 4 further includes throughhole 8 and throughole 10 located at respective upper and lower ends of the stretch rod 4. Throughholes 8, 10 are in fluid communication with hollow center 6. Stretch rod 4 may also be substantially solid, in which case the blow gas is injected from another source, not shown.

Figure 4:
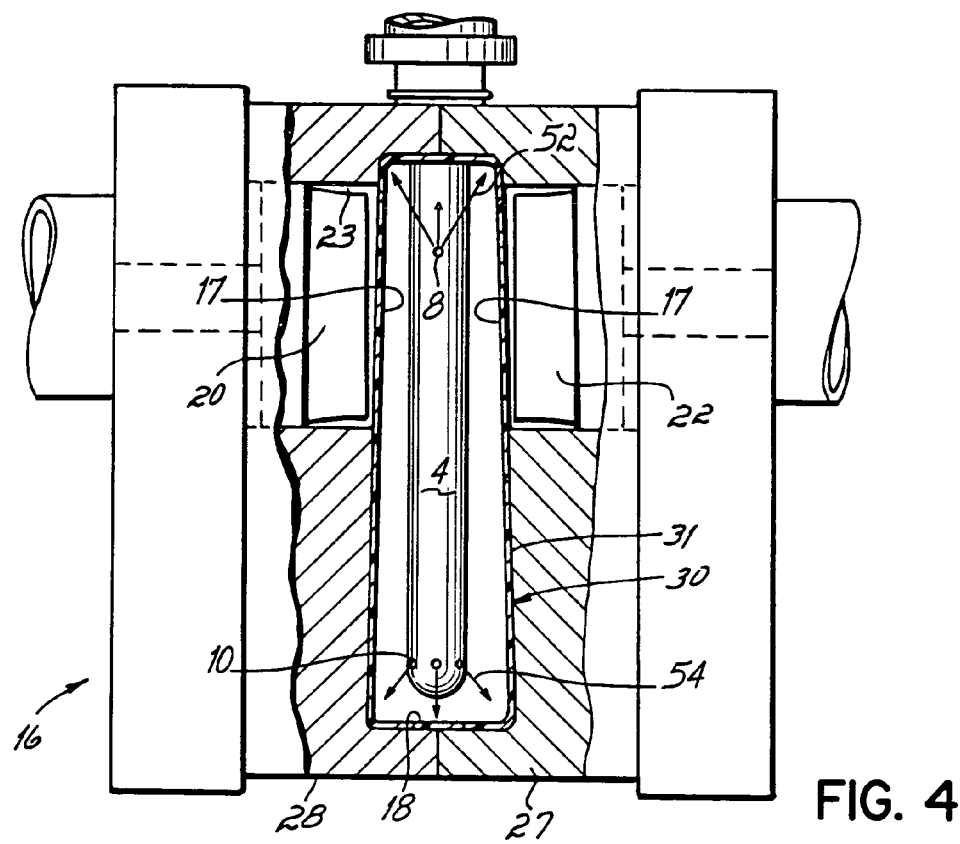
FIG. 4 is a cross-section taken along 4—4 of FIG. 3 of the closed blow mold showing the movable mold segments in their first retracted position.
Figure 5:
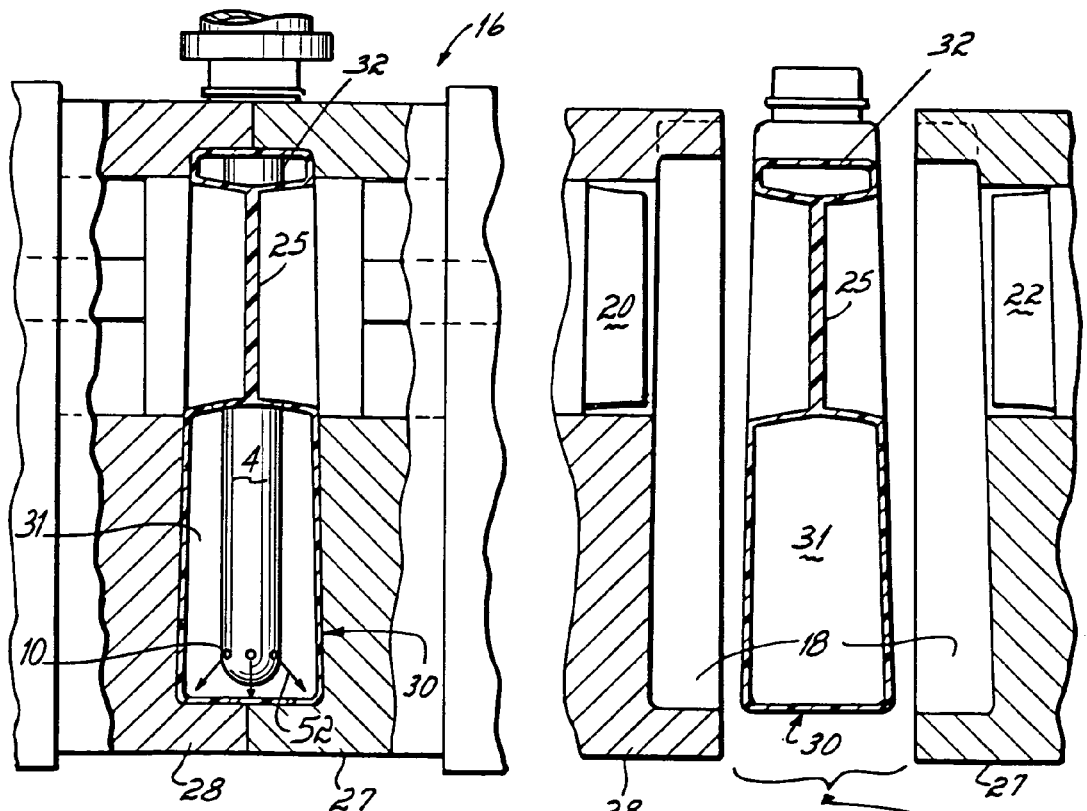
FIG. 5 is a view similar to FIG. 3 showing the movable mold segments in their second position compressing an interior wall surface of the bottle into contact with a facing interior wall surface of the bottle to bond the surfaces and form an integral handle.
Figure 6:
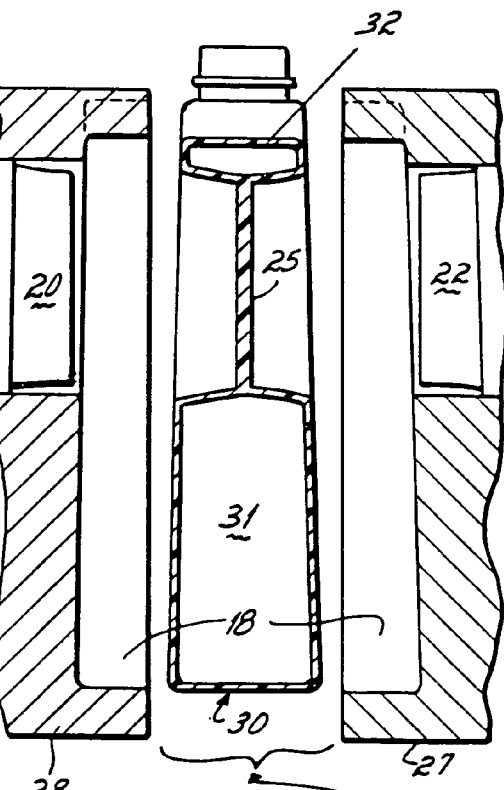
FIG. 6 is a view similar to FIG. 3 showing the movable mold segments in their retracted position and the blow mold opened to reveal the blow molded bottle in cross section.

The blow mold apparatus 2 further includes blow mold 16 which includes a hollow bottle-defining blow mold cavity 18, the interior wall surface of which defines and corresponds to the desired shape of the exterior surface of the hollow bottle body 31 (shown in FIG. 5). The blow mold 16 further includes handle-defining movable mold segments 20 and 22 (shown in FIGS. 4–6) conforming to the desired shape of handle 32. As shown in FIGS. 4–6, movable mold segments 20 and 22 are physically separate and independent of each other except for communicating at an interface therebetween forming a compressed bonded area 25 and handle 32 of bottle 30. The blow mold cavity fully shapes blow molded bottle 30, and the movable mold segments fully shape handle 32 or foot projection 40 (shown in FIG. 12). Movable mold segments 20 and 22 may optionally be heated by means of electric heating elements (not shown) or other suitable means.

Figure 8:
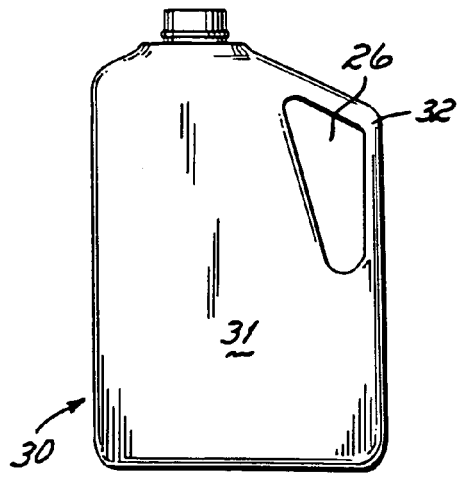
FIG. 8 shows the finished blow molded bottle of FIG. 7 with the compressed area removed forming a handle opening.

One embodiment of the bottle produced using the apparatus and method of the present invention is shown in FIG. 8. As shown, the bottle 30 has a smooth exterior surface around the entire periphery, free of grooves which surround substantially the entire circumference of the bottle 30 in the region where the handle 32 is formed in the bottle 30. Additionally, it is clear that the article is free of circumferential rings connecting the handle 32 to the bottle 30 and the compressed area 25 has been removed or trimmed out by conventional methods well known in the art forming a handle opening 26.

The interior wall surface of blow mold cavity 18 is also free of inwardly projecting ridges which extend around substantially the entire circumference of the blow mold cavity 18. Blow mold cavity 18 shown in FIG. 1 constitutes the rear one-half section 27 of blow mold 16 which defines the rear of the bottle 30. The front half section 28 of blow mold 16 (shown in FIGS. 4–6), which defines the front section of the bottle, is identical to the rear section 27 of blow mold 16. Each mold half 27 and 28 defines a fully shaped handle 32. When the blow mold 16 is closed, the handle-defining movable mold segments 20 and 22 are in a first retracted position (FIG. 4) which creates a void 23 of about ¼ inch to ⅜ inch around the periphery of each segment 20, 22 and about 0.010 to 0.030 inch void will be around the movable mold segments 20, 22, when it is in the closed position. This void will be used to vent trapped air in the blow mold 16 as the movable segments 20, 22 move inward and pinches the material to form the handle area. The original void of ¼ inch to ⅜ inch is thus reduced as the movable mold segments 20, 22 move inward to form the missing body surrounding the handle 32 in the blow mold cavity 18. As explained above, this invention utilizes the strain hardening and other material characteristics of PET in blowing and forming the handle 32 because it does not fill the voids 23 formed by the movable mold segments 20, 22.

As shown in FIG. 1, a PET preform 44 is inserted into the blow mold cavity 18. The perform 44 may be formed by one of a number of known techniques including injection and compression molding, such as are disclosed in U.S. Pat. Nos. 4,151,250; 4,153,667 and 3,781,395. The preform 44 is either heated to the appropriate stretch temperature of between about 190° F. to about 265° F. (for PET) prior to insertion into the blow mold cavity 18, utilizing conventional techniques well known in the blow molding art, or it may reach the appropriate stretch temperature by cooling after being injection molded on a single stage PET machine. Preferably, prior to insertion into the blow mold cavity 18, an unblown uniaxially longitudinally oriented preform 44 of polyethylene terephthalate is heated to the appropriate stretch temperature of between about 190° F. to about 265° F. It will be appreciated that perform 44 may not be of the shape shown in FIG. 1 and that suitable materials other than PET, as disclosed herein, may be used. For example, in view of the description for overcoming the problems particularly associated with PET, certain advantages of this invention may be exploited with other polyesters such as polyethylene naphthalate, or polycarbonate, polyvinyl chloride, polypropylene and copolymers thereof, styrenes and polyolefins.

Figure 3:
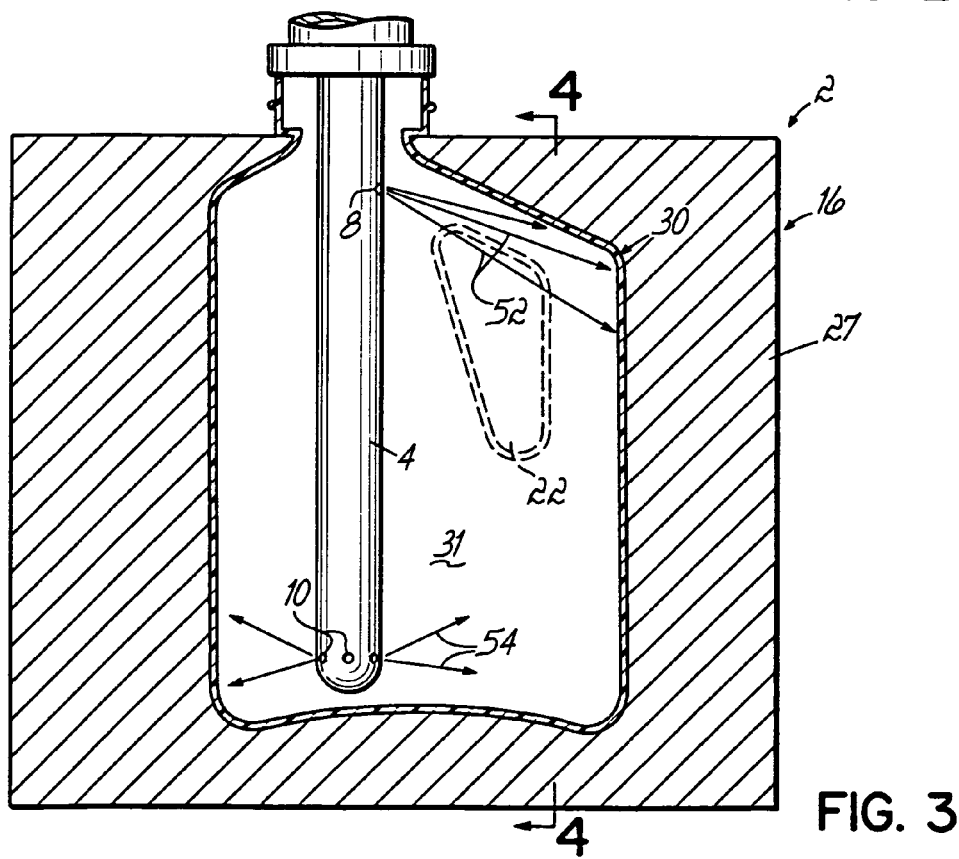
FIG. 3 is a view similar to FIG. 1 showing blow gas from the stretch rod being directed onto an interior surface of the preform where the handle is to be formed.

Once the unblown PET preform 44 has been inserted into blow mold cavity 18, blow mold 16 is closed therearound by any means suitable in the art. Preform 44 is at a temperature in the stretch temperature range of about 190° F. to about 265° F. to biaxially orient and conform it to the blow mold cavity 18 and produce a bottle of desired shape, and movable mold segments 20, 22 are in their first retracted position. The stretch rod 4 is inserted into the interior of the preform 44 and stretches the preform 44 a predetermined amount. Preferably a suitable amount of blow gas is discharged through throughholes 8, 10 while the stretch rod 4 stretches the preform 44 so that a small layer of blow gas forms between the terminal end of the stretch rod 6 and the end of the preform 44. As such, the stretch rod 4 does not make physical contact with the preform 44. After the preform 44 is stretched, blow gas is injected both around the exterior of the stretch rod 4 as indicated by arrows 50 and out of throughholes 8, 10 as indicated by arrows 52, 54. The blow gas biaxially orients and conforms the preform 44 to the shape of blow mold cavity 18 (also shown in FIG. 3). The blow gas is injected at a pressure of between about 100 psi and about 750 psi and at a temperature of between about 40° F. and about 120° F. The PET preform 44 does not blow into voids 23 as shown in FIG. 3. Rather, the PET will slide over these voids and fill the blow mold cavity 18 to conform to the shape of the bottle 30.

The stretch rod 4 has an outside diameter between about 0.25 in. to about 1.0 in. with a wall thickness between about 0.020 in. and 0.040 in. The diameter of throughhole 8 measures between about 0.010 in. and about 0.085 in. The diameter of throughhole 10 measures between about 0.015 in. and about 0.090 in.

As shown in FIGS. 4 and 5, while the exterior wall of bottle 30 communicates and conforms to the shape of blow mold cavity 18, the blow gas is stopped and blow mold 16 depressurized. Thereafter, the blow gas is again discharged but only from throughholes 8, 10. Advantageously, throughhole 8 is located along stretch rod 4 so that the blow gas discharged from throughhole 8 impinges at least a portion of an interior wall 17 of the preform 44 at a sufficient pressure to force the preform 44 to remain in conformity with the blow mold cavity 16 while the integral handle 30 is formed. As the blow gas is directed on the interior wall 17 of the preform, movable mold segments 20 and 22 are advanced within the blow mold cavity 18 from a first retracted position to a second position thereby compressing that portion of the interior wall surface of the blow molded bottle 30 corresponding to movable mold segment 20 into contact with the corresponding facing portion of the interior wall surface of movable mold segment 22 of the bottle 30 to bond those surfaces under an elevated temperature and form therebetween an integral handle 32 extending away from the exterior wall of the blow molded bottle 30. Without the blow gas impinging the area where the handle 32 is formed, the handle 32 may collapse onto itself as the movable mold segments 20, 22 move inwardly to form the handle 32. Once the facing wall surfaces of the PET bottle 30 are contacted and heat bonded, as shown in FIG. 5, blow gas is reinjected and the blow mold 16 repressurized.

Figure 7:
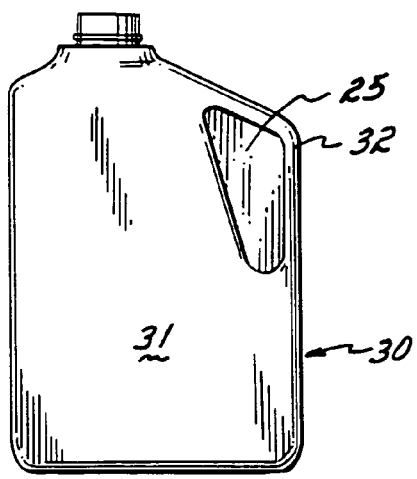
FIG. 7 shows a blow molded bottle after removal from the blow mold with a compressed bonded area as defined by the movable mold segments and an integral handle.

Thereafter, the blow mold 16 is opened by retracting blow mold segments 20 and 22 and separating mold halves 27 and 28 which frees the bottle 30. Bottle 30 is removed from blow mold 16 having an integral handle 32. A compressed and bonded area 25 as defined by mold segments 20 and 22 is shown in FIG. 7. The material of area 25 is trimmed out after removal from the blow mold to form a handle opening 26 in bottle 30 (shown in FIG. 8). Removal of the bonded material may be accomplished through means well known in the art such as laser, water jets or mechanical impact de-flashing. Preferably the trimming leaves a reinforcing rib along the inside of the handle as formed by bonding of adjacent areas of the wall.

Figure 9:
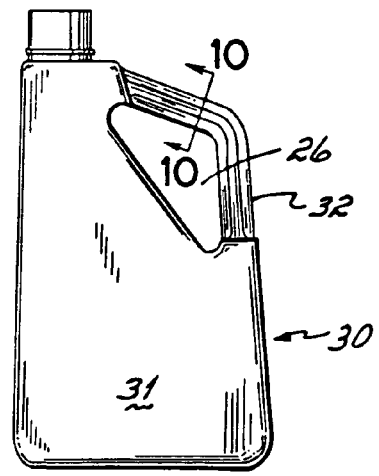
FIG. 9 shows an alternative embodiment of a finished blow molded bottle with the compressed area as defined by the movable mold segments removed forming a handle opening and an integral handle.
Figure 10:
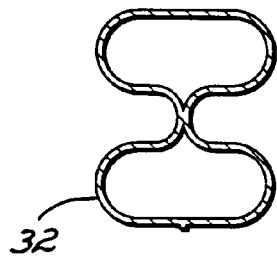
FIG. 10 is a cross sectional view taken along line 10—10 of FIG. 9 showing the integral handle configuration.
Figure 11:
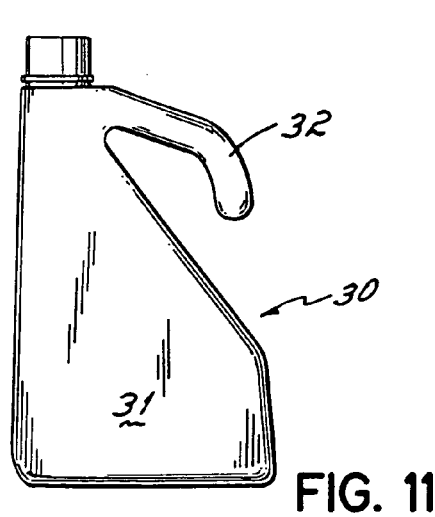
FIG. 11 shows another alternative embodiment of a finished blow molded bottle with the compressed area as defined by the movable mold segments removed forming an integral handle.

FIGS. 8, 9, and 11 show finished blow molded bottles with integral handles 32. As can be seen, since the handle or projection 32 is formed from the blow mold 16 and movable mold segments 20, 22, it may have any suitable cross-section (FIG. 10), including cored or hollow, and may be of any suitable size. In addition, if desired, a name or identification symbol can be molded into the handle by including such name or symbol in mold cavity 18. Furthermore, the handle 32 may be made from recycled or reground PET and may be clear, colored, or crystallized.

Figure 12:
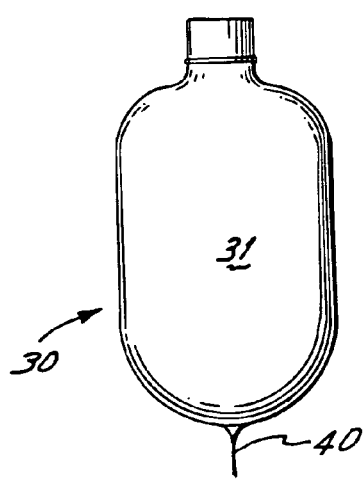
FIG. 12 shows an embodiment of a finished blow molded bottle with the compressed area as defined by the movable mold segments forming a projection at the bottom of the bottle.

It will be appreciated by those skilled in the art that the method of the present invention is adaptable to produce a wide variety of PET articles with integral PET projections thereon, one example of which is a blow molded bottle 30 with an integral handle connected thereto at two points as is shown in FIGS. 7–9. Other products include, but are not limited to, funnels, buckets, pitchers, etc. Any of the above articles may have a handle attached at two points or at one point (FIG. 11) so that it functions as a hook, or they may have a base structure or feet molded thereon. An example of a blow molded container 30 having a compressed foot projection 40 is shown in FIG. 12. This shows that a projection or handle can be formed on the article in a variety of positions, such as the bottom, side, or upper end. For example, a handle on the bottom of a bottle can be provided to facilitate hanging the bottle upside down for drainage or other purposes. In addition, multiple feet can be formed onto the lower end of the blow molded article or bottle, using the method of this invention, to provide a stable base or support. It will be further appreciated that the integral projection or handle may be formed on the blown article or bottle at any location, whether the wall thickness is relatively thick or thin.

The preferred embodiment of the method of this invention has been described in connection with inserting an unblown preform 44 of polyethylene terephthalate into a blow mold 16 having a hollow bottle-defining blow mold cavity 18 and movable mold segments 20, 22 which move toward each other from a first retracted position to a second position within the blow mold 16 to define and form therebetween a handle 32 extending from the exterior wall of the molded bottle 30. The preferred method of the present invention utilizes a blow mold having a hollow article-defining blow mold cavity 18. The hollow article-defining blow mold cavity 18 has an interior wall surface which defines and corresponds to the entire desired shape of the exterior surface of the hollow article to be blow molded therein. Further, the blow mold 16 has movable mold parts or segments 20, 22 which move within the blow mold 16 relative to the blow mold cavity 18. The movable mold segments 20, 22 define an area within the blow mold 16 where an integral handle or projection 32 is formed. Additionally, the interior wall surface of the blow mold cavity 18 is free of inwardly projecting ridges which extend around substantially the entire circumference thereof and does not require communication with an injection mold cavity at the interface between the injection mold and blow mold cavities for forming a handle. The article-defining blow mold cavity 18 defines the article and the movable mold segments 20, 22 while in communication with each other within the blow mold 16 in their "pinching" position, correspond to the location on the article's exterior wall from which the projection of handle extends.

Figure 13:
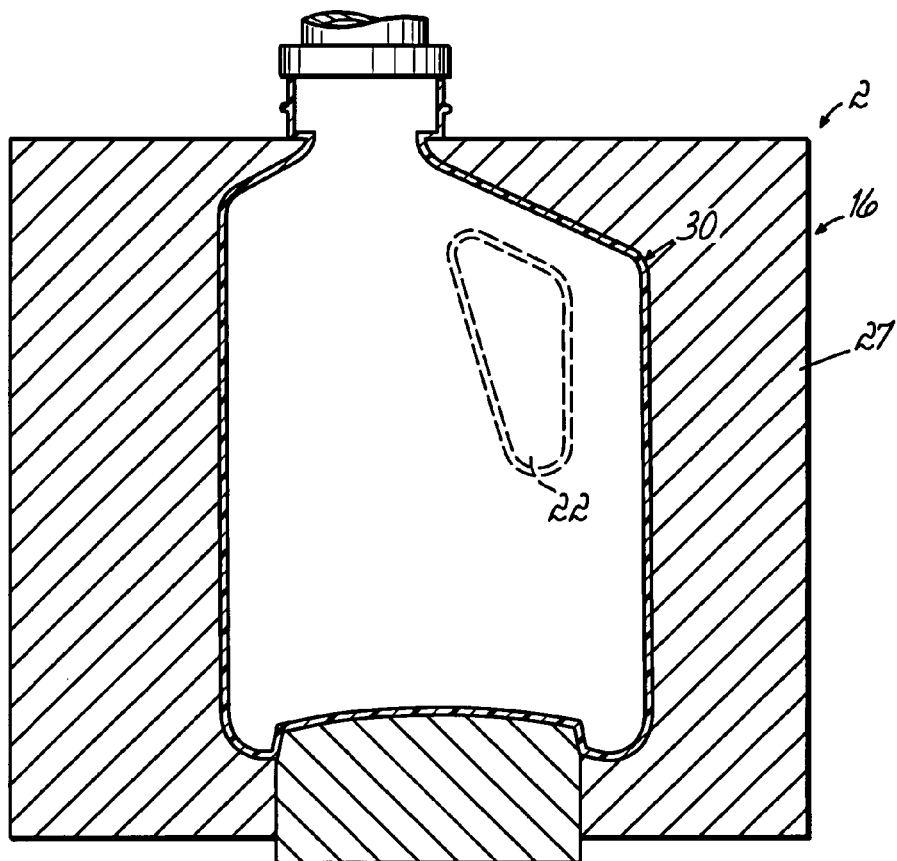
FIG. 13 is a cross-sectional view of the closed blow mold showing a movable bottom plug.
Figure 14:
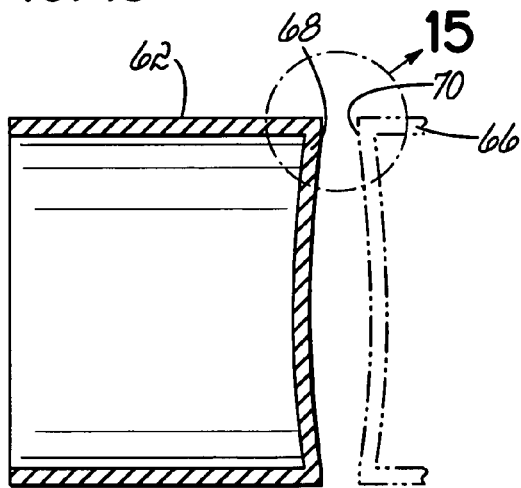
FIG. 14 is a cross-sectional view in partial phantom showing one embodiment of the two movable mold segments when they have been moved inwardly to compress the material being molded.

FIG. 13 shows a cross-section of blow mold 16 having a bottom plug 50 which can be of any desired shape or configuration and may be movable relative to the interior of the blow mold to create any desired shape or contour in the bottom wall of the blow molded bottle 30.

Figure 15A:
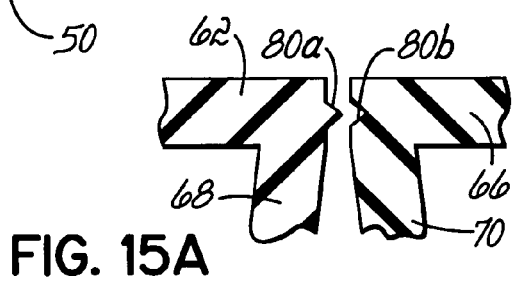
FIGS. 15A–D are enlarged partial cross-sections of the area shown circled in FIG. 14 wherein the perimeter portion of each movable mold segment has a relief pattern.
Figure 15B:
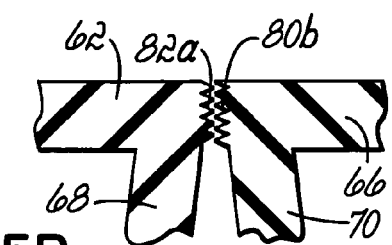
Figure 15C:
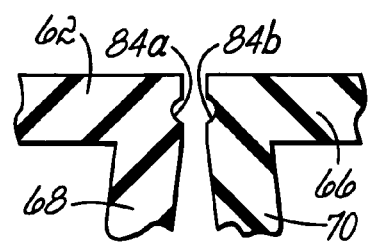
Figure 15D:
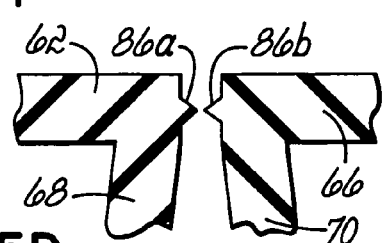
Figure 16:
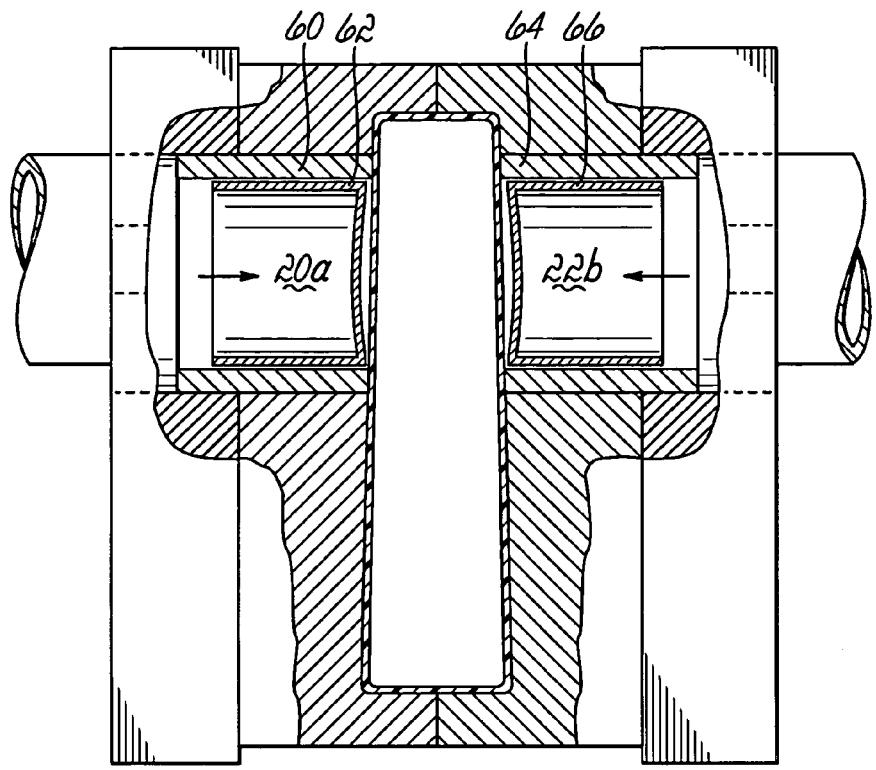
FIG. 16 is a cross-sectional view of the closed blow mold showing the movable mold segments in their retracted position.
Figure 17:
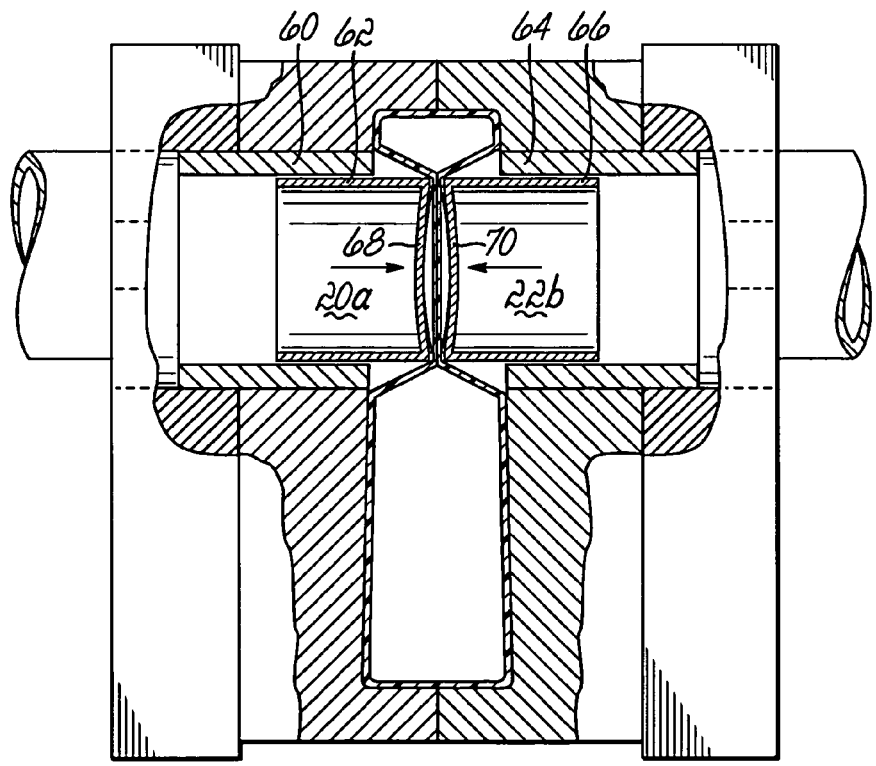
FIG. 17 is a cross-sectional view of the closed blow mold of FIG. 16 showing the movable mold segments in their extended, compression orientation.

With reference to FIGS. 14–17, there is shown an alternative embodiment of movable mold segments 20A, 22A, wherein those parts consist of separate movable sections 60 and 62 on the left side as shown in FIGS. 16 and 17 and 64 and 66 on the right side of those Figures. FIG. 16 shows movable mold segments 20A, 22A in their retracted or seated position in the mold sidewall. FIG. 17 shows elements 62 and 66 in their "pinching" position. In a preferred embodiment, at least elements 62 and 66 have their exterior surfaces 68, 70, respectively, heated to a suitable temperature by heating elements (not shown). In the case of PET, a preferred temperature for the surfaces 68, 70 of movable mold segment portions 62, 66 is 380° F.

As shown with specific reference to FIGS. 14 and 15A–D, the perimeter of surfaces 68, 70 may be provided with a mating or corresponding relief pattern so as to further pinch the material being molded therebetween to aid in the step of removing the web formed when the handle is formed. FIG. 15A shows an example of a tooth and groove relief pattern 80A, 80B. FIG. 15B shows a sawtooth relief pattern 82A, 82B. FIG. 15C shows corresponding grooves 84A, 84B as the relief pattern in which case a bead of the molding material is formed upon the pinching action provided by movable mold segment portion 62, 66. FIG. 15D shows corresponding teeth 86A, 86B on the perimeter of exterior surfaces 68, 70.

While it has been described that exterior surfaces 68, 70 of movable mold segment portion 62, 66 may be heated, movable mold segment portion 60, 64 may or may not be heated, depending upon the material being molded. It is contemplated that if segment portions 60, 64 are not heated, that will aid in the phase change/crystallization of the molding material at the interior perimeter of where the handle is formed. This will also aid in the process of removing the flashing or web formed by the compression during handle formation.

The blow mold apparatus 2 may be a machine for completely forming, in a single stage, a hollow blow molded article or bottle having an integral projection or handle extending from an exterior wall section thereof, or may be a wheel or in-line type machine. Since the apparatus is a single-stage and has a single mold, it requires only one mold configured in the shape of the hollow article having movable mold segments therein. The blow mold apparatus 2 may be configured from well known blow molding devices, as will be understood to a person of ordinary skill in the art, and further details need not be supplied here.

It will also be appreciated that various thermoplastic materials other than PET may be advantageously employed, either singly or in various combinations, in carrying out the method of the present invention to produce blow molded articles having integral projections or handles. When a multi-layer preform is used, which is produced by coextrusion or coinjection of multiple layers of different materials, it is imperative that there be at least one layer which possesses the requisite barrier, orientation, temperature resistance and clarity properties for the desired final article. For example, it may be desirable to use a coextrusion of PET and polycarbonate, since polycarbonate has high strength and temperature resistance properties, but poor barrier properties, and PET has desirable barrier properties.

Other materials which may be directly substituted and/or combined with PET to form articles using the method of the present invention are: Goodyear CLEARTUF HP high performance polyester, polyethylene naphthalate, high density polyethylene, polypropylene, polycarbonate, polyvinyl chloride and copolymers thereof.

The Goodyear high performance polyester, CLEARTUF HP, has a barrier resistance to oxygen of approximately five times that of PET and a glass transition temperature of about 250° F., which obviates the need for heat setting when hot-filling at between about 210° F.–220° F. CLEARTUF HP is biaxially orientable and forms a clear article when blow molded. Furthermore. CLEARTUF HP has a melting point of about 538 F, which results in higher temperature resistance than PET.

While specific embodiments of the invention have been shown and described, it should be apparent to those skilled in the art to which the invention pertains that many modifications and numerous changes may be made thereto without departing from the spirit and scope of the invention. Accordingly, the invention is not limited by the foregoing description, but is limited by the scope of the claims appended thereto.

What is claimed is:

1. A method of making a hollow blow molded article having an integral projection extending from the exterior wall thereof comprising the steps of:
    (a) inserting an unblown preform of thermoplastic polymer into a blow mold having a hollow article-defining blow mold cavity and movable mold segments which move toward each other from a first retracted position to a second position within said blow mold to define and form therebetween a projection extending from the exterior wall of the molded article;
    (b) closing said blow mold;
    (c) inserting a stretch rod into the interior of said preform to stretch said preform a predetermined amount;
    (d) injecting a first blow gas into the interior of said preform when said blow mold is closed, said movable segments are in said first retracted position, and said preform is at a temperature in the stretch temperature range thereof to conform said preform to said blow mold cavity and produce the article of desired shape;
    (e) exhausting said first blow gas from the interior of the article and advancing said movable mold segments within said blow mold from said first retracted position to said second position thereby compressing said first opposing surface of the interior wall portion into contact with said second opposing surface of the interior wall to bond said opposing surfaces under an elevated temperature and form an integral projection extending from the exterior wall of the blow molded article;
    (f) directing a second blow gas from said stretch rod onto at least a portion of an interior wall of the article, the interior wall portion having first and second opposing surfaces;
    (g) opening said blow mold; and
    (h) removing the blow molded article having the integral projection from said blow mold.

2. The method according to claim 1 wherein at least a surface portion of each of said movable mold segments is heated.

3. The method according to claim 1, further comprising trimming out the bonded surfaces.

4. The method according to claim 1 further comprising exhausting said second blow gas from said article prior to opening said blow mold.

5. The method according to claim 2 wherein said material removed from the molded article is recycled.

6. The method according to claim 1 further comprising retracting said stretch rod prior to opening said blow mold.

7. The method according to claim 1 wherein said unblown preform of thermoplastic polymer is polyethylene terephthalate.

8. The method according to claim 2 wherein said surface portions of each of said movable mold segments are heated to about 380° F.

9. The method according to claim 7 wherein said unblown preform of polyethylene terephthalate is heated to a temperature in the stretch temperature range thereof prior to inserting said preform into said blow mold.

10. The method according to claim 9 wherein the inside of said preform is heated to facilitate subsequent bonding of said opposing surfaces.

11. The method according to claim 9, wherein said polyethylene terephthalate has a stretch temperature range of about 190° F. to about 265° F.

12. The method according to claim 9, wherein said unblown preform of polyethylene terephthalate is uniaxially longitudinally oriented prior to inserting into said blow mold.

13. The method according to claim 9, wherein said blow gas is injected into the interior of said polyethylene terephthalate preform when said blow mold is closed to biaxially orient and conform said preform to said blow mold cavity while said preform is at a temperature in the stretch temperature range thereof.

14. The method according to claim 1, wherein said unblown preform of thermoplastic material is selected from the group consisting of polyester, polycarbonate, polyvinyl chloride, polypropylene, polyethylene naphthalate, high density polyethylene, and copolymers thereof.

15. The method according to claim 1, wherein said unblown preform is made by coinjection, coextrusion, compression molding or combinations thereof.

16. The method of claim 1 wherein said article defining blow mold cavity has a release coating on the interior surface thereof.

* * * * *